(12) United States Patent
Braun et al.

(10) Patent No.: US 7,069,707 B2
(45) Date of Patent: Jul. 4, 2006

(54) VERTICAL TUBULAR BAGGING MACHINE

(75) Inventors: Harald Braun, Gruenberg (DE); Walter Baur, Gruendau (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 0 days.

(21) Appl. No.: 10/882,113

(22) Filed: Jun. 30, 2004

(65) Prior Publication Data

US 2005/0044822 A1 Mar. 3, 2005

(30) Foreign Application Priority Data

Jul. 9, 2003 (DE) ................................ 103 30 825

(51) Int. Cl.
*B65B 11/00* (2006.01)
(52) U.S. Cl. ............................ 53/201; 53/451; 53/456; 53/476; 53/551; 53/574; 53/576; 53/578; 53/579; 493/476
(58) Field of Classification Search .................. 53/450, 53/451, 452, 456, 570, 574, 575, 576, 578, 53/579, 551, 552, 201, 550; 493/475, 496, 493/808
See application file for complete search history.

(56) References Cited

U.S. PATENT DOCUMENTS 3,296,770 A * 1/1967 Wilson ........................ 53/552
4,829,745 A * 5/1989 Behr et al. ..................... 53/451
4,924,655 A * 5/1990 Posey ......................... 53/133.2
5,832,700 A    11/1998 Kammler et al.
5,845,465 A * 12/1998 Bennett ....................... 53/551
5,930,983 A *  8/1999 Terminella et al. ........... 53/436
2005/0039433 A1  2/2005 Braun et al.
2005/0081490 A1  4/2005 Metz et al.

FOREIGN PATENT DOCUMENTS

| CH | 490 995      | 7/1990 |
| DE | 3 841 056    | 6/1989 |
| EP | 0 818 389 A1 | 1/1998 |
| JP | 3 85208      | 4/1991 |

* cited by examiner

*Primary Examiner*—John Sipos
*Assistant Examiner*—Christopher Harmon
(74) *Attorney, Agent, or Firm*—Flynn, Thiel, Boutell & Tanis, P.C.

(57) ABSTRACT

In order to be able to easily exchange the fill pipe in a vertical tubular bagging machine, where a flat foil web is reshaped on a forming shoulder into a foil tube running over a fill pipe, a forming shoulder is suggested which can be opened. A shoulder sleeve out of two separate sleeve parts is formed by this forming shoulder, a shoulder connection consists of two separate connection parts, each one sleeve part and adjoining connection part form one component, the two components describe the forming shoulder, and one component can be removed from the other component in order to be able to remove the fill pipe transversely with respect to the transport direction from the forming shoulder.

9 Claims, 3 Drawing Sheets

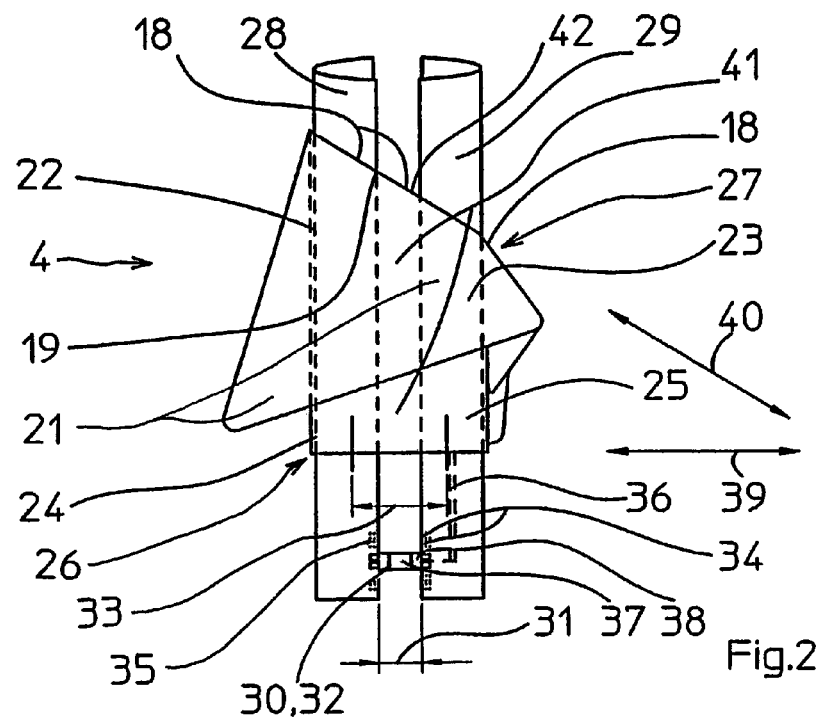
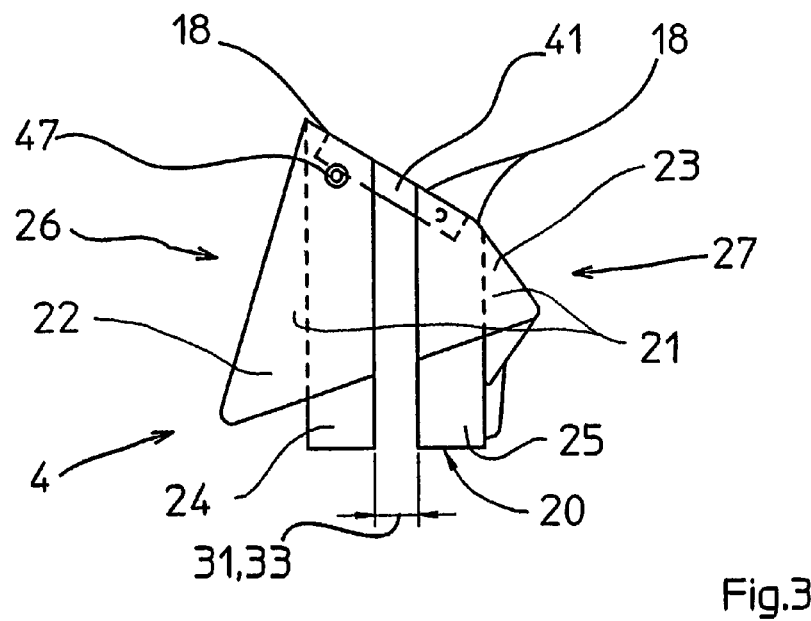

VERTICAL TUBULAR BAGGING MACHINE

FIELD OF THE INVENTION

The invention relates to a vertical tubular bagging machine according to the generic terms of Claim 1.

BACKGROUND OF THE INVENTION

Vertical tubular bagging machines are used to create and fill tubular bags and are commonly known. A foil web unwound from a storage roller is reshaped on these machines into a vertically aligned foil tube by means of a forming shoulder. The lower tube end is filled, welded and separated from the remaining foil tube in order to create tubular bags filled in this manner.

Depending on the type of bag to be created, varying forming shoulders are utilized. Generally a forming shoulder consists of a one-part shoulder sleeve, over which the flat foil web runs in order to reach a guiding edge. The foil web is then reshaped at the guiding edge in order to move on as a vertically aligned foil tube after passing the guiding edge. The foil tube runs thereby through an annular passage, which is defined on the outside by a shoulder connection and on the inside by the fill pipe.

The known design has the disadvantage that the fill pipe can be removed laterally only when the forming shoulder is first removed.

A forming element for reshaping a foil web into a foil tube is known from the CH 490 995, which forming element consists of two separate parts. These parts form together an outer guide part. In order to be able to remove a fill pipe laterally, these parts are separated from one another.

The known forming element has the disadvantage that it is less suited for a continuous foil run since the incoming foil web is hardly supported.

SUMMARY OF THE INVENTION

The basic purpose of the invention is to further develop a vertical tubular bagging machine of the above-described type so that a lateral fill-tube removal is possible, and that the foil web moving toward the guiding edge has a good support.

This purpose is attained according to the characterizing part of Claim 1. Accordingly, the shoulder sleeve is formed out of two separate sleeve parts and the shoulder connection out of two separate connection parts, each one sleeve part and adjoining connection part form one component, the two components describe the forming shoulder, and one component can be removed from the other component in order to be able to remove the fill pipe, transversely with respect to the transport direction, from the forming shoulder.

The suggested tubular bagging machine has the advantage that a lateral fill-pipe removal is possible in a simple manner since the components can be separated from one another in order to remove the fill pipe from therebetween. The foil web is supported in a reliable manner since each component has a sleeve part, and the two sleeve parts form a common shoulder sleeve or at least sufficiently replace same in parts. The components can furthermore be easily handled, which permits a relatively quick fill-pipe removal.

Further advantageous embodiments of the suggested tubular bagging machine are described in Claims 1 to 11.

When a rear component is provided in the tubular bagging machine, which component is positioned toward the incoming foil web, and a front component in the area of the adjoining edges of the foil tube (Claim 2), then on the one hand a location-precise run of the foil web with respect to the guiding edge and on the other hand a location-precise run of the edges of the foil web toward a longitudinal-sealing device is achieved.

With a device for adjusting and fixing of the spacing between the components (Claim 3) it is achieved that the forming shoulder can be adjusted to a different foil-web width and thus to a different bag width. When thereby in addition according to Claim 4 a height adjustment for adjusting and fixing the relative height of a component relative to the other component is provided, then it is possible to adjust the two upper edges of the sleeve parts or of the connection parts, which upper edges form the guiding edge, even when a spacing exists between the components, so that the edges continue opposingly in their direction of extent. A spacing between the sleeve parts or the components can be spanned by means of a stretch material, in particular a strip, whereby one edge of the stretch material forms a part of the guiding edge (Claim 5). The guiding edge then does not have any gap, and safely reshapes the foil web.

The most precise foil guiding is achieved according to Claim 6 when the sleeve parts are precisely joined and closely fitted.

In principle, many techniques are conceivable in order to connect the components easily and thus operationally friendly to one another. Thus it is possible to connect the components to one another in a technically simple manner via a plug connection (Claim 7). In the alternative, one component is connected to the other component via a swivel joint and a fastening device for locking of the component, wherein one component can be swung out of the way, in a position resting on the other component (Claim 8). After the fastening device has been released, it is thus possible to swing one component out of the way in order to remove the fill pipe.

A significant improvement of the service friendliness of the tubular bagging machine is achieved when, according to Claim 9, the fill pipe is formed out of two troughs that are releasably connected to one another and are aligned against one another with their insides. It is then possible after an opening of the forming shoulder to, in addition, open the fill pipe by removing one trough laterally. This has the great advantage that a dosing worm, which is provided in the fill pipe and which is very often utilized in the case of powder dosings, can be removed laterally from the fill pipe. Thus a complicated upward removal of a relatively long and heavy dosing worm, which upward removal is generally hindered by upper components, is thus avoided. The lateral removal of the dosing worm has in addition the advantage that the space above the dosing worm need no longer be saved and can be utilized for other appropriate assemblies. Or this space can be eliminated entirely, which results in a more compact design and thus lesser space requirement for the vertical tubular bagging machine.

When according to Claim 10 a device for adjusting and locking of the space existing between the two troughs is provided, then it is possible to adjust the fill pipe to a different bag format by means of a distance-adjusting means.

A conveyor worm is removed in the easiest manner from the fill pipe in direction toward the longitudinal-sealing device since a suitable free space exists there caused by the design of the machine. This is possible when, corresponding to Claim 11, the releasable trough is provided in the area of the adjoining edges of the foil tube.

BRIEF DESCRIPTION OF THE DRAWINGS

The invention will be described in greater detail hereinafter in connection with the figures illustrating exemplary embodiments. In the drawings:

FIG. 2 is a perspective view of the forming shoulder together with a part of the two troughs of FIG. 1;

FIG. 3 is a side view of a forming shoulder consisting of two components, whereby the spacing between the components can be adjusted;

DETAILED DESCRIPTION

Figure 1:
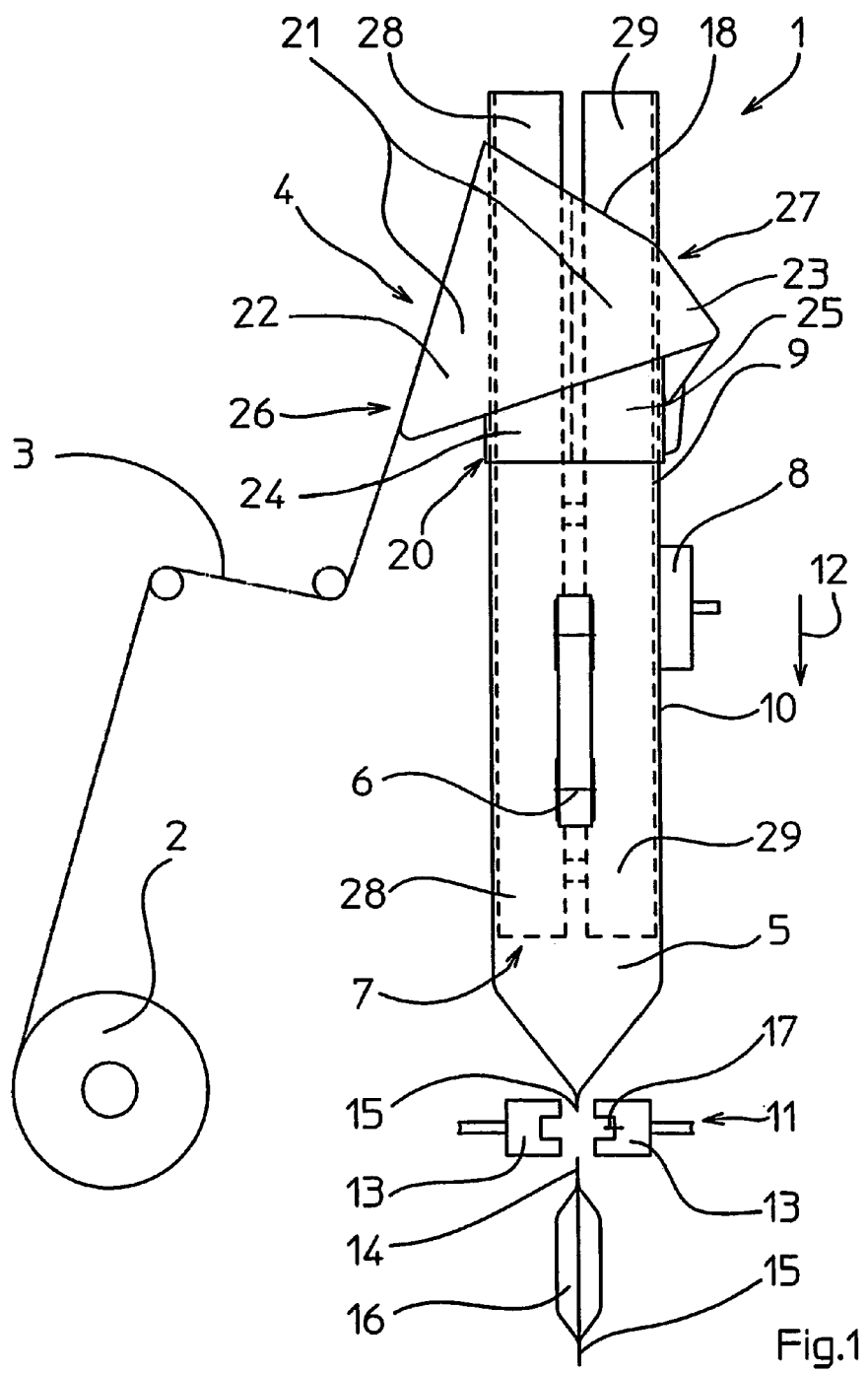
FIG. 1 is a side view of a vertical tubular bagging machine with a foil web unwound from a storage roller, a forming shoulder for reshaping the foil web into a foil tube, a longitudinal-sealing device and a cross-sealing device for welding of the foil tube, and a fill pipe for receiving and filling of the foil tube, whereby the forming shoulder is formed of two components, which include each a sleeve part and a connection part, and the fill pipe consists of two troughs.

A foil web 3 is in a vertical tubular bagging machine 1 unwound from a storage roll 2 (FIG. 1). A forming shoulder 4 is used to reshape the foil web 3 into a foil tube 5. A foil-removing means 6 is utilized to further transport the foil web 3 and the foil tube 5. A vertically aligned fill pipe 7 is provided for receiving and filling of the foil tube 5. A longitudinal sealing device 8 is used to weld the edges 9 of the foil web 3 and thus to create a longitudinal sealing seam 10 of the foil tube 5. A cross-sealing device 11 with welding jaws 13, which can be moved against one another and which weld the foil tube 5 transversely with respect to its transport direction 12, is provided for creating of top seams 14 and bottom seams 15 on tubular bags 16.

A separating device 17 is utilized to separate the tubular bag 18 from the foil tube 5. The forming shoulder 4 has a guiding edge 18 on an upper edge 19 of shoulder connection 20 surrounding the fill pipe 7, and a shoulder sleeve 21, which is fastened to the curved guiding edge 18 and pointing outwardly away from the guiding edge 18. The shoulder sleeve 21 (FIG. 2) is formed of two separate sleeve parts 22, 23. The shoulder connection 20 consists of two separate connection parts 24, 25. Each one sleeve part 22, 23 and an adjoining connection part 24, 25 form a component 26, 27. The two components 26, 27 describe the forming shoulder 4. One component 27 can be removed from the other component 26 in order to be able to remove the fill pipe 7 or only a part thereof transversely with respect to the transport direction 12 out of the forming shoulder 4.

The fill pipe 7 consists of two troughs 28, 29, which are aligned against one another with their insides, whereby one trough 29 is releasably connected to the other trough 28. A device 30 serves as the connection for adjusting and locking of the spacing 31 existing between the two troughs 28, 29. The releasable trough 29 is provided in the area of the adjoining edges 9 of the foil tube 5. The rear component 26 is positioned toward the incoming foil web 3. The front component 27 is provided in the area of the adjoining edges 9 of the foil tube 5 and is almost closed in front in order to place the edges 9 against one another. The device 30 serves also as a device 32 for adjusting and fixing of the spacing 33 between the components 26, 27. A height-adjusting means 34 for adjusting and fixing of the relative height of one component 27 relative to the other component 26 houses a plurality of bores 35 in the troughs 28, 29 and plug modules 38 on the device 30. A linkage 36 is connected to the component 27. The spacing 31 between the troughs 28, 29 is adjusted in direction 39, for example, to a greater bag width by a distance-adjusting means on a turning thread 37. The guiding edge 18 of the component 27 is subsequently reached by the lower placement of the plug module 38 and thus of the linkage 36, whereby the entire component 27 is positioned lower. Thus the part of the guiding edge 18, which part is provided on the component 27, is moved in direction 40 of the guiding edge. The plug module 38 makes it possible for the trough 29 and the component 27 to be pulled off in a simple manner forwardly (in direction 39) in order to in this manner remove a dosing worm (not illustrated) housed in the fill pipe 7 laterally in direction 39 out of the fill pipe 7.

A spacing 31, 33 is provided between the sleeve parts 22, 23 and the connection parts 24, 25 in the exemplary embodiment of FIG. 2, which spacing is spanned by means of a stretch material 41. An upper edge 42 of the stretch material 41 forms thereby a portion of the guiding edge 18.

A strip, which is supported on a wheel 47, serves in the exemplary embodiment of FIG. 3 for bridging the guiding edge 18, and the spacings 31, 33 are the same. Otherwise what has been stated regarding FIG. 2 applies here also.

Figure 4:
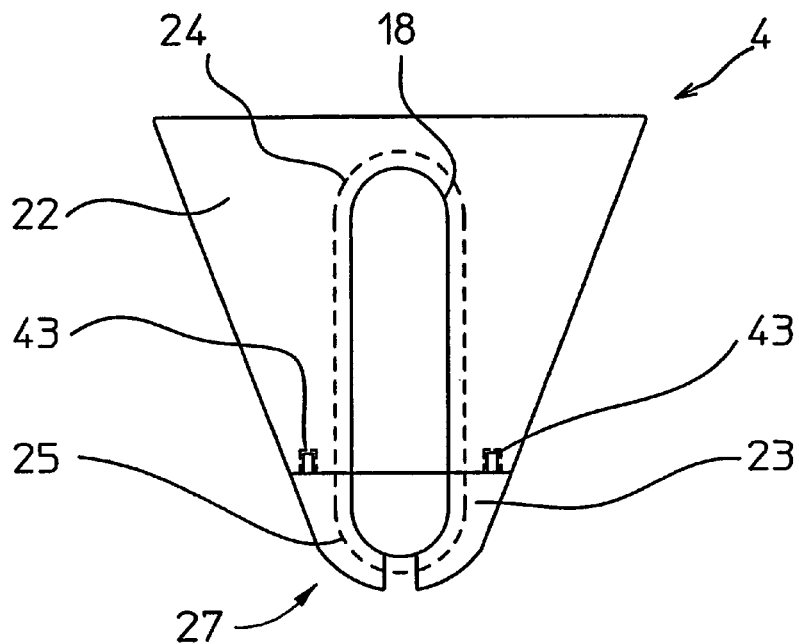
FIG. 4 is a view from above of a further forming shoulder, which consists of two components, and in which the components are connected via a plug connection.
Figure 5:
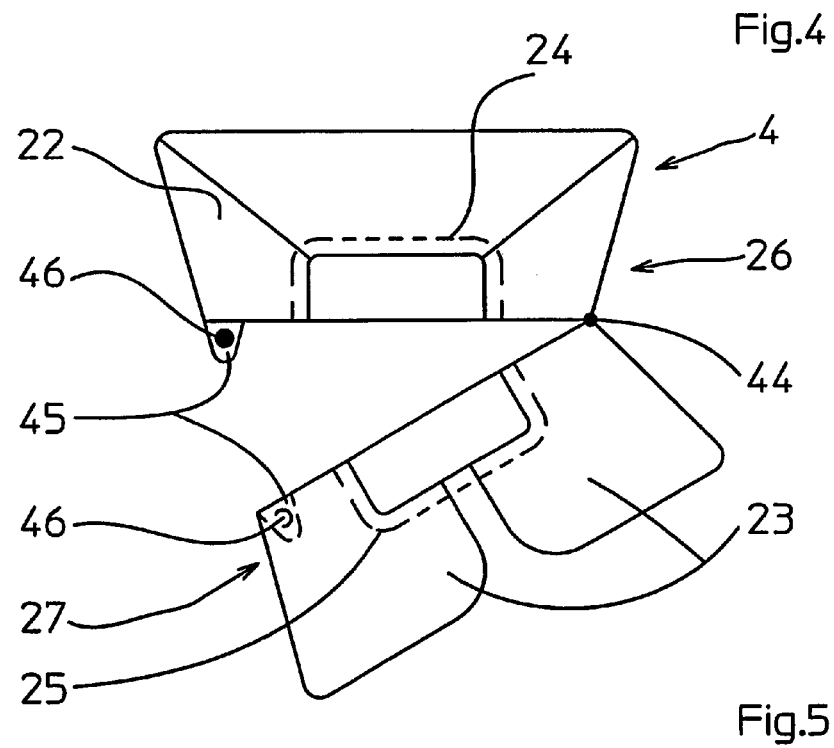
FIG. 5 is a view from above of a forming shoulder for an approximately rectangular fill-pipe cross section, where the one component is connected to another component via a swivel joint.

The sleeve parts 22, 23 in the exemplary embodiments of FIGS. 4 and 5 are joined closely, that is, the forming shoulders 4 cannot be adjusted in format. However, they can be opened easily in order to remove in forward direction, for example, a fill pipe, or after the removal of a trough of a fill pipe a dosing worm. In both exemplary embodiments it is easy to move the sleeve parts 22, 23 away from one another. This is done by a plug connection 43 in the subject matter of FIG. 4. Whereas in the subject matter of FIG. 5, one component 27 is connected to the other component 26 via a swivel joint 44, and a fastening device 45 is provided for locking of the component 27, which can be swung away, in a position supported by the other component 26. A bolt (not illustrated) is in the closed state placed from below through the two recesses 46 of the fastening device 45 in order to prevent an opening up of the forming shoulder.

| | |
|---|---|
| 1 | Tubular bagging machine |
| 2 | storage roller |
| 3 | foil web |
| 4 | forming shoulder |
| 5 | foil tube |
| 6 | foil-removing means |
| 7 | fill pipe |
| 8 | longitudinal-sealing device |
| 9 | edge |
| 10 | longitudinal sealing seam |
| 11 | cross-sealing device |
| 12 | transport direction |
| 13 | welding jaw |
| 14 | top seam |
| 15 | bottom seam |
| 16 | tubular bag |
| 17 | separating device |
| 18 | guiding edge |
| 19 | upper edge |
| 20 | shoulder connection |
| 21 | shoulder sleeve |

-continued

| | |
|---|---|
| 22, 23 | sleeve part |
| 24, 25 | connection part |
| 26, 27 | component |
| 28, 29 | trough |
| 30 | device for adjusting |
| 31 | spacing |
| 32 | device for adjusting |
| 33 | spacing |
| 34 | height-adjusting means |
| 35 | bore |
| 36 | linkage |
| 37 | turning thread |
| 38 | plug module |
| 39, 40 | direction |
| 41 | stretch material |
| 42 | upper edge |
| 43 | plug connection |
| 44 | swivel joint |
| 45 | fastening device |
| 46 | recess |
| 47 | wheel |

The invention claimed is:

1. A vertical tubular bagging machine comprising a foil web unwound from a storage roller, a forming shoulder for reshaping the foil web into a foil tube, a foil-removing means for the further transport of the foil web and of the foil tube in a transport direction, a vertically aligned fill pipe comprising first and second troughs for receiving and filling the foil tube, a longitudinal-sealing device for welding of edges of the foil web and thus for the creation of a longitudinal sealing seam of the foil tube, a cross-sealing device with welding jaws, which can be moved against one another and weld the foil tube transversely with respect to its transport direction, for creating of top seams and bottom seams on tubular bags, and a separating device for separating of the tubular bags from the foil tube, wherein the forming shoulder has a curved guiding edge on an upper edge of a shoulder connection surrounding the fill pipe and a shoulder sleeve joined to the curved guiding edge and pointing outwardly away from the guiding edge, wherein the shoulder sleeve is formed of two separate sleeve parts, the shoulder connection is formed of two separate connection parts, each one said sleeve part and an adjoining said connection part form a component, wherein one said component can be removed from the other component in order to be able to remove the fill pipe from the forming shoulder transversely with respect to the transport direction, and wherein one said component is connected to the other said component via a swivel joint, and a fastening device is provided for locking of the component, which can be swung away, in a position supported by the other component.

2. The tubular bagging machine according to claim 1, wherein one of the components comprises a rear component positioned toward the incoming foil web, and the other one of the components comprises a front component provided in the area of the adjoining edges of the foil tube.

3. The tubular bagging machine according to claim 1, wherein a height adjustment apparatus is provided for adjusting and fixing of the relative height of one said component relative to the other said component.

4. A vertical tubular bagging machine comprising a foil web unwound from a storage roller, a forming shoulder for reshaping the foil web into a foil tube, a foil-removing means for the further transport of the foil web and of the foil tube in a transport direction, a vertically aligned fill pipe to receive and fill the foil tube, a longitudinal-sealing device for welding of edges of the foil web and thus for the creation of a longitudinal sealing seam of the foil tube, a cross-sealing device with welding jaws, which can be moved against one another and weld the foil tube transversely with respect to its transport direction, for creating of top seams and bottom seams on tubular bags, and a separating device for separating of the tubular bags from the foil tube, wherein the forming shoulder has a curved guiding edge on an upper edge of a shoulder connection surrounding the fill pipe and a shoulder sleeve joined to the curved guiding edge and pointing outwardly away from the guiding edge, wherein the shoulder sleeve is formed of two separate sleeve parts, the shoulder connection is formed of two separate connection parts, each one said sleeve part and an adjoining said connection part form a component, wherein one said component can be removed from the other component in order to be able to remove the fill pipe from the forming shoulder transversely with respect to the transport direction, and
    wherein a spacing is provided between the components, which spacing is spanned by a stretch material, one edge of the stretch material forming a part of the guiding edge.

5. A vertical tubular bagging machine comprising a foil web unwound from a storage roller, a forming shoulder for reshaping the foil web into a foil tube, a foil-removing means for the further transport of the foil web and of the foil tube in a transport direction, a vertically aligned fill pipe comprising first and second troughs for receiving and filling the foil tube, a longitudinal-sealing device for welding of edges of the foil web and thus for the creation of a longitudinal sealing seam of the foil tube, a cross-sealing device with welding jaws, which can be moved against one another and weld the foil tube transversely with respect to its transport direction, for creating of top seams and bottom seams on tubular bags, and a separating device for separating of the tubular bags from the foil tube, wherein the forming-shoulder has a curved guiding edge on an upper edge of a shoulder connection surrounding the fill pipe and a shoulder sleeve joined to the curved guiding edge and pointing outwardly away from the guiding edge, wherein the shoulder sleeve is formed of two separate sleeve parts, the shoulder connection is formed of two separate connection parts, each one said sleeve part and an adjoining said connection part form a component, wherein one said component can be removed from the other component in order to be able to remove the fill pipe from the forming shoulder transversely with respect to the transport direction, wherein the two troughs are vertically aligned with their inside surfaces facing one another, and one said trough is releasably connected to the other trough for removal transverse to the transport direction, and wherein a device is provided for adjusting and locking of the spacing existing between the two troughs.

6. A vertical tubular bagging machine comprising:
    a storage roller for providing a foil web;
    a forming shoulder for reshaping the foil web into a foil tube, the forming shoulder comprising:
        a first component comprising a shoulder connection part and a sleeve part, the shoulder connection part having a curved guiding edge on an upper part;
        a second component comprising a connection part and a sleeve part; and
        a stretch material spanning the spacing between the first and second components, wherein an upper edge of the material comprises a portion of the guiding edge,
    wherein one component is removable from the other component;

a foil moving device for advancing the foil web in a transport direction;

a vertically aligned fill pipe comprising first and second troughs with one said trough removably connected to the other said trough, said fill pipe extending through the forming shoulder to fill the foil tube, the forming shoulder surrounding the fill pipe, wherein removal of one said component enables removal of one of the troughs through the forming shoulder in a direction that is transverse to the transport direction;

a longitudinal-sealing device for welding edges of the foil web to form a longitudinal sealing seam for a closed foil tube;

a cross-sealing device for welding the foil tube transversely with respect to the transport direction to form top and bottom seams of tubular bags; and a separating device for separating the tubular bags from the foil tube.

7. The tubular bagging machine according to claim 6, comprising a device for adjusting the spacing between the first and second troughs.

8. The tubular bagging machine according to claim 6, comprising a device for adjusting the spacing between the first and second components.

9. The tubular bagging machine according to claim 6, comprising a device for adjusting the spacing between the first and second components and for adjusting the spacing between the first and second troughs.

* * * * *

UNITED STATES PATENT AND TRADEMARK OFFICE
CERTIFICATE OF CORRECTION

| | |
|---|---|
| PATENT NO. | : 7,069,707 B2 |
| APPLICATION NO. | : 10/822113 |
| DATED | : July 4, 2006 |
| INVENTOR(S) | : Harald Braun et al. |

It is certified that error appears in the above-identified patent and that said Letters Patent is hereby corrected as shown below:

On the title page, item (73) and in column 1, in the Assignee's Name, change "Rovema Verpackungsmachinen GmbH" to --Rovema Verpackungsmaschinen GmbH--.

Signed and Sealed this

Twenty-first Day of November, 2006

JON W. DUDAS
*Director of the United States Patent and Trademark Office*